Figure 1:
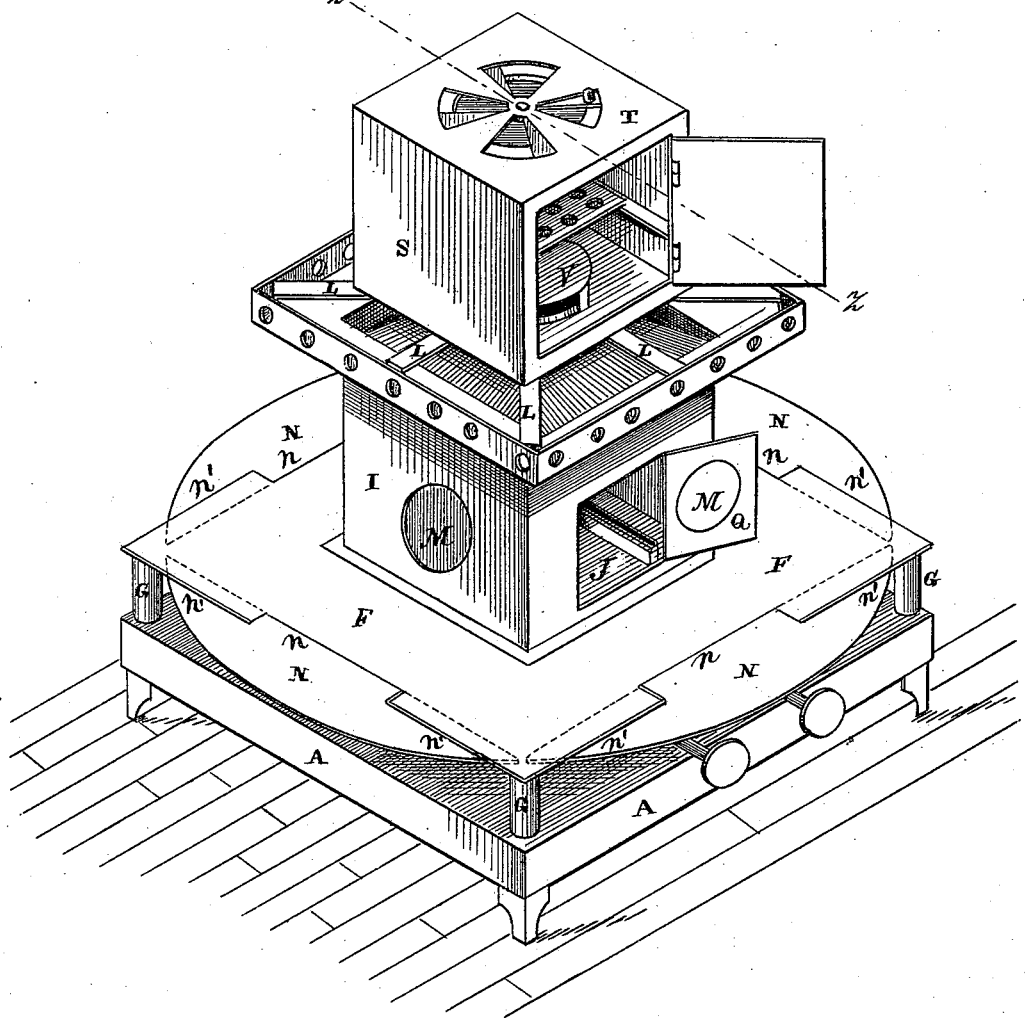

2 Sheets—Sheet 1.

H. L. HOWSE.
Oil-Stove.

No. 208,317.  Patented Sept. 24, 1878.

Witnesses
Geo. H. Strong.
Frank A. Brooks.

Inventor
Henry L. Howse
by Dewey & Co
Attys

N. PETERS, PHOTO-LITHOGRAPHER, WASHINGTON, D. C.

2 Sheets—Sheet 2.
H. L. HOWSE.
Oil-Stove.
No. 208,317.  Patented Sept. 24, 1878.
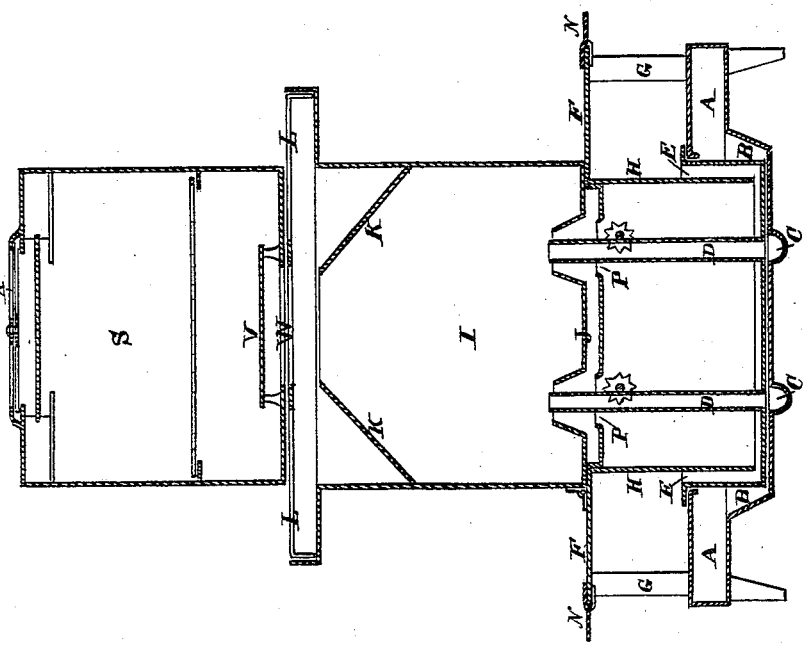
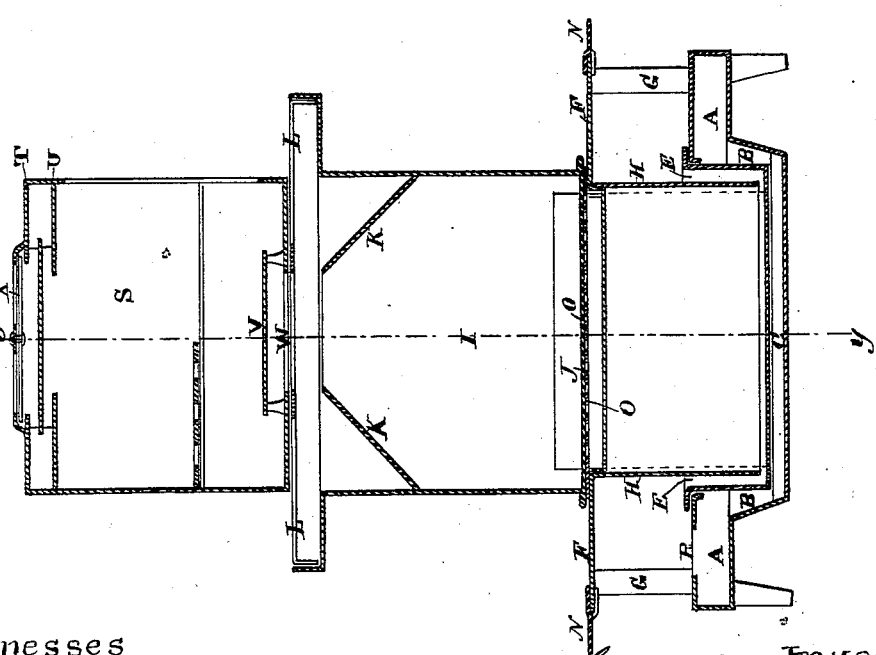
Witnesses
Geo. H. Strong.
Frank A. Brooks.
Inventor
Henry L. Howse
by Dewey & Co
Attys

UNITED STATES PATENT OFFICE.

HENRY L. HOWSE, OF SAN FRANCISCO, CALIFORNIA.

IMPROVEMENT IN OIL-STOVES.

Specification forming part of Letters Patent No. 208,317, dated September 24, 1878; application filed July 29, 1878.

*To all whom it may concern:*

Be it known that I, HENRY L. HOWSE, of the city and county of San Francisco, and State of California, have invented an Improvement in Oil-Stoves; and I do hereby declare the following to be a full, clear, and exact description thereof, reference being had to the accompanying drawings.

My invention relates to certain improvements in that class of stoves which are intended to employ oil as a fuel, and these improvements are especially based upon a patent which was issued to me, and dated March 5, 1878.

My present improvements consist, first, in a novel construction of the oil-reservoir, by which I am enabled to separate the great bulk of oil from that which is being used by the wicks, and to feed it to the wicks in thin sheets by gravitation, while at the same time, by the action of a peculiar downwardly-moving current of air, caused by the draft which it afterward supplies, this sheet of oil is kept constantly cool. A wick-receiver is made in the bottom of the reservoir below the wick-tubes, which rest upon the bottom, and the oil is fed into these sunken spaces at each end, so as to supply the wicks.

My invention further consists in the application of an extension hot-plate and removable hot-shelves around the base of the heater or stove proper, so that I utilize any waste and radiant heat at this point, as well as at the top of the apparatus, and in certain other details of construction, which will be more fully described by referring to the accompanying drawings, in which—

Figure 1 is a perspective view of my stove. Fig. 2 is a vertical section on the line $z\ z$ of Fig. 1. Fig. 3 is a vertical section on line $y\ y$, Fig. 2.

A is the oil-reservoir of my stove, and it may be made entirely of cast-iron, so that it will always be perfectly tight. The bottom plate is made with a large central depression or pan, B, as shown, and in the bottom of this pan are made the longitudinal sunken grooves or depressions C, which I call "wick-receivers," these grooves being formed in a line with and below the wick-tubes, for a purpose to be hereinafter described. A suitably-protected opening, R, allows the reservoir to be replenished from time to time. The wick-tubes D are secured in the bottom of a secondary pan, E, which rests upon the bottom of the pan B, and has a flange around its upper edge to rest upon the upper plate of the reservoir, so that this secondary pan nearly fills the pan B, and forms a hollow square within the tank A, which is surrounded with oil. The plate F is fitted to rest upon the corner-posts G, arising from the oil-reservoir; and this plate, which is made of considerable size, is permanently secured to these posts. From the lower surface of this plate a hollow flange, H, projects downward into the pan E, and extends nearly to the bottom of this pan. This flange stands just within the sides of the pan E, and surrounds the wick-tubes in a manner similar to that described in my former patent; but it performs additional duties in the present case, caused by the different construction of the reservoir. This reservoir, as before described, has its central pan nearly filled by the central pan E, which also rests upon the bottom of the pan B of the reservoir, so that it practically excludes the oil from this bottom, except at the points where the wick-receivers or slots C extend beyond the lower end of the wick-tubes, and thus leave a space into which the oil may flow. These receivers permit the wicks to extend below the bottom of the wick-tubes, and thus to be in a position to take up the oil to the best advantage. Above the permanent plate F is the body of the stove, having its base or bottom plate, J, hinged at one side to the plate. This bottom plate, J, also serves as a flame-guard plate, and has long slots made in it to correspond with the wick-tubes, the sides of these slots being bent to stand at an incline toward the wick-tubes, as shown. By thus hinging this part of the stove to the plate F, I am enabled to make access to all parts of the stove and lamp exceedingly convenient, and without interfering or having to remove any articles on said hot-plate. The conical or roof-shaped plate K receives the heat from the lamps, and concentrates it as described in my former patent. A door, Q, in the side of the stove-body I allows access to the interior without raising it.

The rack L, which is placed upon the top of the stove, is made square, and by constructing it in this shape I provide a large space upon which to place sauce-pans and other vessels, which is a most important point in this class of stoves.

The plate F is extended around the base of the stove, as before described, and receives its heat from the plate J; and it is in such a position that all the radiant heat from the body of the stove will be utilized to heat vessels which may be placed upon this plate. This is materially assisted by the openings M, which may be protected by mica, and which will radiate considerable heat.

I have constructed extension-shelves N, which are slitted or cut, as shown in Fig. 1, so that the portion $n$ of the shelves will fit over the edges of the plates or shelves F, and the end portions $n'$ pass under the edges of said plates or shelves, thus securing them in place. These extension-shelves give me a broad space for the reception of plates and other articles, where nothing has ever before been placed. By the use of this shelf I utilize the radiant heat and a large quantity which is produced from the plate J. A perforated plate, O, rests upon the plate J, surrounding the wick-tubes, as in my former patent. Openings P are made alongside the wick-tubes through the bottom or plate F, so as to admit the air; and this forms the draft, and keeps the wick-tubes cool, while the perforated plate O serves to distribute the air as it rises.

The whole mechanism is cheap, easily managed, and convenient of access.

The oven S, I make with a double top, T U, and a radiator, V, is placed between said double top and the bottom of said oven, so that the heat, entering the opening W, will be distributed and heat the entire surface, and, escaping at X, will heat a vessel at that point.

Having thus described my invention, what I claim as new, and desire to secure by Letters Patent, is—

1. In an oil-stove, the oil-reservoir A, having a central depressed bottom, B, said bottom having the longitudinal sunken grooves or wick-receivers C, in combination with the interior pan E, having the wick-tubes D opening through its bottom, so as to allow the wick to enter the receivers, which are filled with oil from their ends, substantially as and for the purpose herein described.

2. The combination, with the stove-body I, having bottom J, of the plate F, having the removable extension or extensions N, substantially as and for the purpose specified.

3. The combination, with the square oil-reservoir, having the plate F mounted upon it, and the square stove-body I, of the square grate or rack L, whereby the heating-surface is extended, and the corners of the rack or grate adapted to receive sauce-pans, substantially as specified.

4. The oven S, with its double top T U, radiator V, and the central openings, W X, substantially as and for the purpose herein described.

In witness whereof I hereunto set my hand.

HENRY LANGLEY HOWSE.

Witnesses:
GEO. H. STRONG,
FRANK A. BROOKS.